United States Patent [19]

Bunin

[11] 3,899,848

[45] Aug. 19, 1975

[54] ANIMATED CARTOON CHARACTER AND METHOD

[75] Inventor: Morey Bunin, New York, N.Y.

[73] Assignee: Aniforms, Inc., New York, N.Y.

[22] Filed: Jan. 20, 1975

[21] Appl. No.: 542,451

[52] U.S. Cl. ........................ 46/126; 46/156; 352/54

[51] Int. Cl.² ...................... A63H 7/00; G03B 19/18

[58] Field of Search .......... 46/126, 135 R, 156, 171; 352/54

[56] References Cited

UNITED STATES PATENTS 3,070,920 1/1963 Bunin ........................... 46/135 R X

*Primary Examiner*—Robert Peshock

*Assistant Examiner*—J. Q. Lever

[57] ABSTRACT

An animated cartoon character for television and animated films is provided for the continuous production of moving-line type animated characterizations. It includes an open outline primary form fabricated from readily deformable material defining, for example, a human head and body shape. Covering the open space within said deformable outline is black cloth material to permit superposition of the character on a background scene. The video signal polarity representing said black material is reversed so that the outline shape of said character may be seen on television as an opaque representation on said background scene.

4 Claims, 4 Drawing Figures

ANIMATED CARTOON CHARACTER AND METHOD

BACKGROUND OF THE INVENTION

In recent years the use of moving-line type characterizations in television transmission has become increasingly popular due primarily to the invention disclosed and claimed in U.S. Pat. No. 3,070,920 dated Jan. 1, 1963 and entitled PUPPET FIGURE AND ANIMATION APPARATUS To simulate traditional animated cartoons the open outline is painted on black deformable material in white, the background and controls being of black material. When photographed under a back and white television camera the polarity of the TV signal is reversed, thus producing a black outline of the figure against a white background. The features, such as eyes, mouth, etc., are also painted in white and appear as black under the camera. This produces the appearance of an animated drawing typical of that of stop-motion drawings. For solid areas, such as arms, legs, clothing, etc., several gray colors are used. The use of this system for broadcast television commercials or entertainment, while effective, is limited because television stations require color and the system described has serious drawbacks in using the characters in scenes with live actors.

One of the most important factors in the above described system is the ease with which an animated figure can be superimposed or "keyed" onto a set or location together with live actors by use of two color television cameras, one televising the animated figure and the other the live actor and set. The process for this superimposition or keying in color is called Chromakey. The low cost and ease with which a cartoon character and live actors can relate together in any desired location, through the use of Chromakey technique makes the above described animation system potentially valuable and desirable. One of the serious problems encountered in the use of the patented device, wherein a deformable outline shape represents the primary outline of a movable object or human form or otherwise, has been that when superimposed or keyed onto a background scene in accordance with standard special effects techniques, such as that of the Chromakey method, the background shows through the object, thereby diminishing the composite effect attempted to be created. To mitigate this problem somewhat it has been necessary to paint a very thick outline on the deformable material so that when superimposed on keyed over a scene it becomes more visible. However, even with this technique the open areas allow the background to be seen through the figure and the excessive thickness of line causes the figure to no longer resemble the typical animated cartoon. Both the thick outline and the fact that the background can be seen through the figure limits the use of the described animation system in this important area of television. Attempts to utilize a figure whose open areas were covered with thin, white or flesh-colored, cloth using normal color televising, were unsuccessful due to shadows appearing on the material when the figure was distorted for normal movement. As shown below, the present invention solves all the problems mentioned above and involves an improvement on the above mentioned patented apparatus, greatly improving the commercial feasibility thereof.

BRIEF SUMMARY OF THE INVENTION

The present invention comprises apparatus for the continuous production of moving-line type animated characterizations and includes in combination at least one essentially two-dimentional open outline primary form fabricated from readily deformable material in the shape of an outline of an object to be presented in a television transmission. Also included is at least one secondary two-dimensional form fabricated in the shape of a feature of said object and means are provided for manipulating said primary and secondary forms. Attached to the readily deformable material and covering the background of the area included within said outline is a thin flexible fabric that normally would appear as black in the video signal. An outline in white is painted on the readily deformable material to represent the desired figure or object. The solid areas are painted in normal colors as desired. The control rods, background, and the thickness, or vertical sides of the readily deformable material are painted in the blue color used for the Chromakey process in television. The polarity of the black and white video signal only is reversed, leaving the color signals normal, thus providing a black outlined figure or object with the colored areas intact and the area covered with the thin cloth now an opaque white, which allows full movement without showing shadows, thereby enabling superimposition or keying of said object on a background scene without the background showing through the object.

DESCRIPTION OF THE PREFERRED EMBODIMENT

Figure 2:
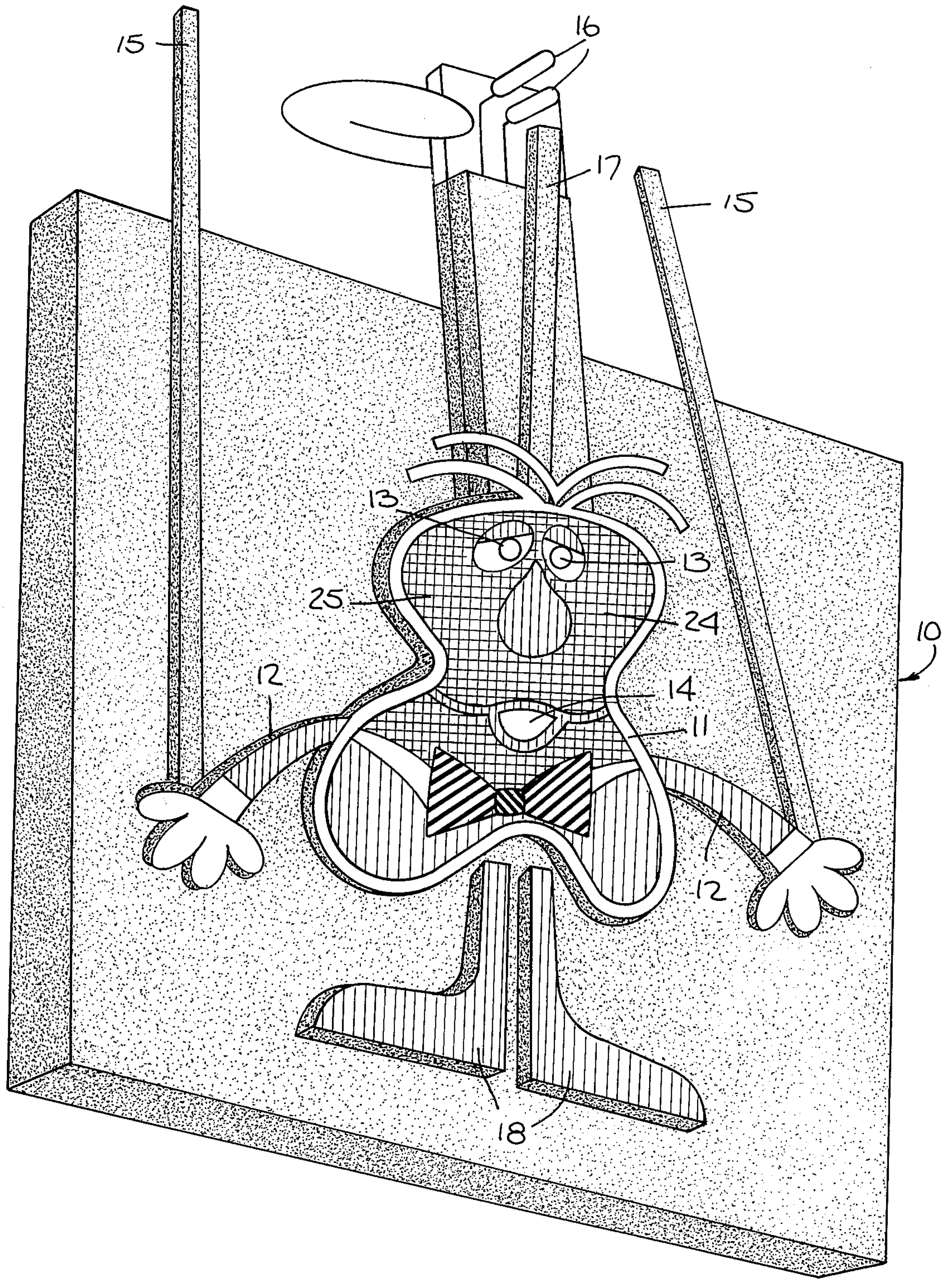
FIG. 2 is an isometric representation of a twodimensional character in accordance with the principles of the present invention.

Referring now to the drawings, and in particular FIG. 2, a two-dimensional form is shown and designated by reference numeral 10. The general description and articulating mechanisms for said figure are described in U.S. Pat. No. 3,070,920, such description being hereby incorporated herein by reference. As described in said patent, the character is a representation of a human figure with a deformable outline 11 (see FIG. 2) fabricated from a flexible material such as sponge rubber, foam polyurethane, or the like. It also includes secondary forms such as arms 12, eyes 13 and mouth 14, which are supported for manipulation independently of the associated primary form 10 by manually controlled members 15, 16 and 17, respectively. Representations of legs and feet 18 are stationary as shown, although they, too, may be deformable and movable if desired.

It is well known in television engineering to create special effects in the television studio by the Chromakey method wherein using the three primary colors of red, blue, and green a subject is presented in front of a blue background, thereafter the blue is cut out of the video signal information leaving an opaque hole therein, and then the latter is reinserted on a background such as a street scene.

Figure 1:
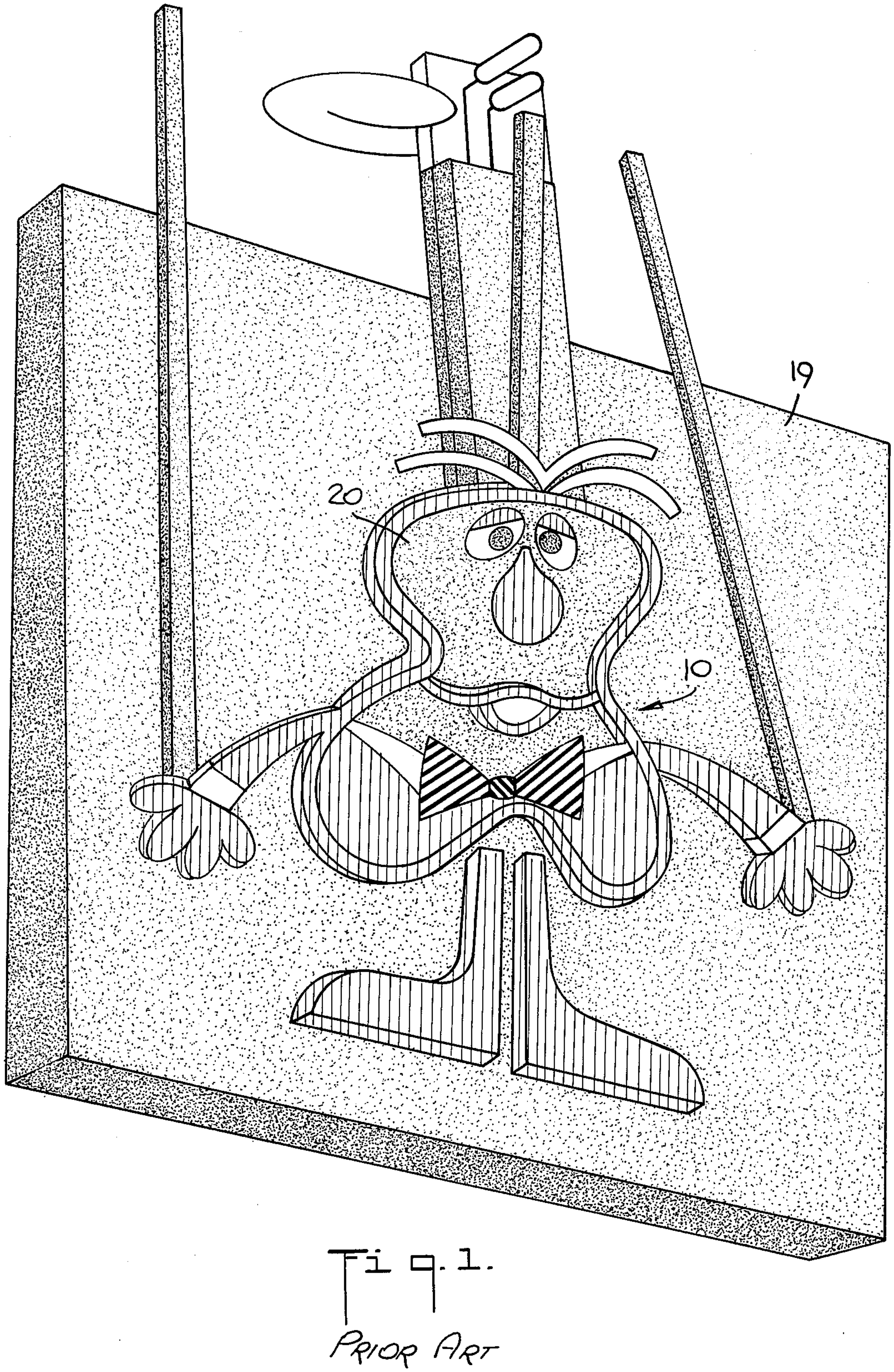
Fig. 1. PRIOR ART
FIG. 1 is an isometric representation of a two-dimensional character in accordance with the prior art.
Figure 3:
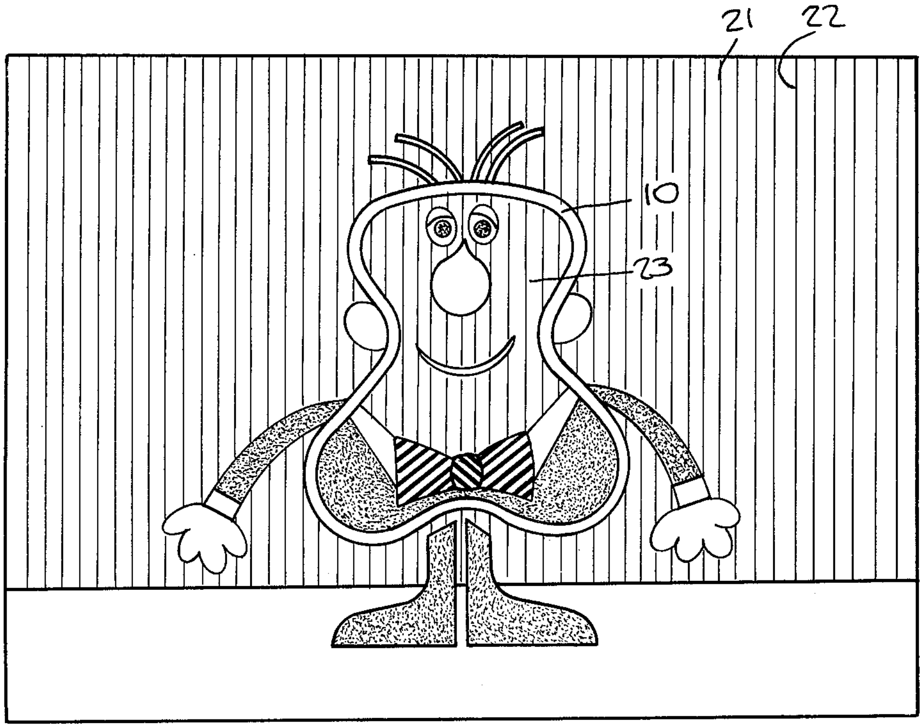
Fig. 3. PRIOR ART
FIG. 3 is a diagrammatic representation of the prior art superposition technique.

FIG. 1 shows the apparatus used in connection with the Chroma Key technique prior to the present invention and FIG. 3 depicts its drawbacks. The two-dimensional form 10 (see FIG. 1) is mounted on a blue background board 19 which shows through the central portion 20 of the form and on use of the Chroma Key technique as shown in FIG. 3 the superposition of form 10 on background scene 21, represented by the vertical lines 22, said background shows through the open part 23 of the form, detracting greatly from the utility and esthetic effect thereof.

Figure 4:
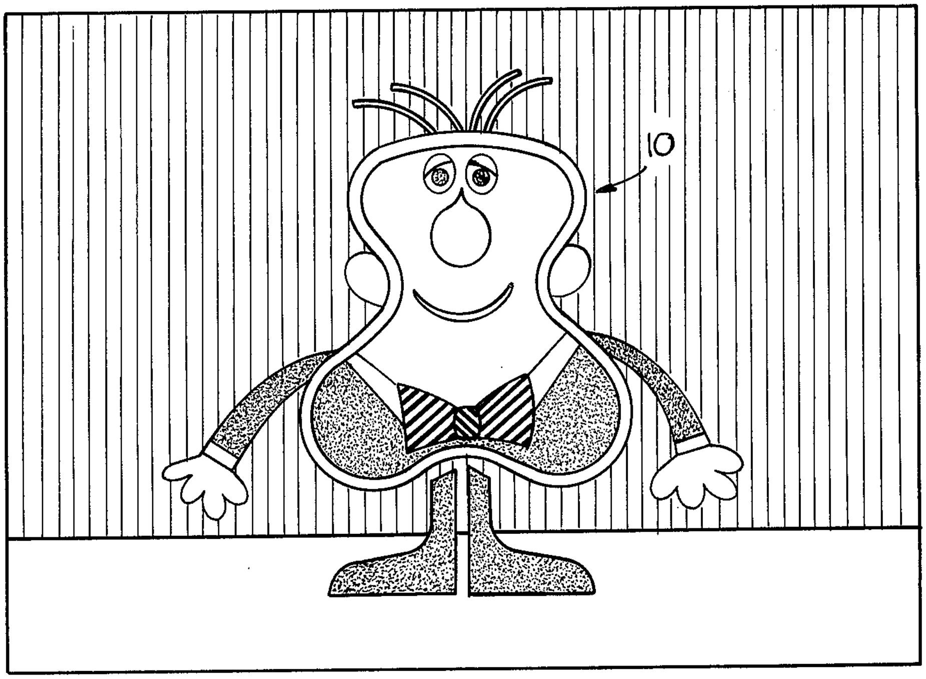
FIG. 4 is a diagrammatic representation of the superposition technique of the present invention.

The present invention involves the Chroma Key technique with the improvement that the area within any of the deformable portions of the character, for instance, the area 24 within deformable outline 11 (see FIG. 2) is covered with a black cloth 25 or the like behind the other features included within said outline and the polarity of the video signal for said area covered by said black cloth is reversed so that upon reinsertion on the background the character 10, apart from the opaque areas included therein, will appear as white in the broadcast video signal and will be opaque so that any background scene 21 on which the object is superimposed will not show through the character, as shown in FIG. 4.

In the above described fashion the utilization of animated two-dimensional characters in television broadcasts has been greatly improved and the utility thereof greatly expanded. It likewise represents a great improvement in stopmotion animated film cartoon techniques in addition to its utility in the television industry.

A detailed description of the well-known Chroma Key color matting technique is set forth in the following publications each of which is hereby incorporated by reference in this specification:

"Electronic Composites in Modern Television" by R. C. Kennedy et al., *Proceedings of The IRE*, November 1958, Vol. 46, No. 11, pages 1798–1807;

"Audio and Video Special Effects," *NAB Engineering Handbook*, 5th ed. 1960, pages 6–155 to 6–161;

G. Millerson, *The Technique of Lighting For Television And Motion Pictures*, 1972, pages 318–323.

While one embodiment of the invention has been shown and described, it is to be understood that changes and additions may be made by those skilled in the art without departing from the scope and spirit of the invention.

I claim:

1. In apparatus for continuous production of movingline type animated characterizations for use in television or moving picture techniques of the type wherein the apparatus comprises in combination at least one essentially two-dimensional open outline primary form fabricated from readily deformable material in the shape of an outline of an object, and at least one secondary two-dimensional form fabricated in the shape of a feature of said object, and means connected to each primary and secondary form for manipulation of the same, the improvement which comprises covering the underside of the area defined by said primary form with an opaque, flexible material normally showing as a black color on television.

2. In the apparatus of claim 1, said flexible material being black textile material affixed to said deformable material and being adaptable to permit lateral movement of said deformable material without appreciable restraint.

3. The method of superimposing a two-dimensional animated character of open outline on a background scene for use in moving pictures or television comprising placing a deformable outline of an object on a neutral background, covering the internal background of the outline of said character with black flexible material that does not restrict articulation of said outline, articulating said object to represent desired motion, optically recording the motion of said object, converting said optical recording to secondary signal information while reversing the optical representation of signals representing said black flexible material to a white representation, and superposing said secondary signal information on other signal information representing a preselected background scene.

4. The method of claim 3 in which said conversion to secondary signal information involves the Chromakey technique and said signals representing said black flexible material are reversed to white representative signals.

* * * * *